United States Patent [19]

Blatter

[11] Patent Number: 5,438,378
[45] Date of Patent: Aug. 1, 1995

[54] VISOR FOR EYEGLASSES

[76] Inventor: Alfred G. Blatter, Box 1256, Fort St. James, British Columbia, Canada, V0J1P0

[21] Appl. No.: 187,868
[22] Filed: Jan. 28, 1994
[51] Int. Cl.⁶ .......................... G02C 7/16; G02C 9/04
[52] U.S. Cl. ........................................ 351/47; 351/44; 2/13
[58] Field of Search .................. 351/49, 44, 47, 48, 351/57, 58, 59, 155, 158; 2/10, 12, 13, 15; D16/309, 310, 340

[56] References Cited

U.S. PATENT DOCUMENTS

| D. 214,344 | 6/1969 | Shindler | 351/47 X |
|---|---|---|---|
| 2,638,593 | 5/1953 | Eloranta | 2/12 |
| 2,998,611 | 9/1961 | Spero | 2/13 |
| 3,011,170 | 12/1961 | Lutz | 2/13 |
| 3,183,523 | 5/1965 | Harrison | 2/13 |
| 3,379,487 | 4/1968 | Amundsen | 351/58 |
| 3,413,057 | 11/1968 | Carmichael | 351/47 |
| 3,597,052 | 8/1971 | Dittman | 351/45 |
| 3,876,295 | 4/1975 | Loughner | 351/47 |
| 4,446,571 | 5/1984 | Ross | 2/13 |
| 4,451,127 | 3/1981 | Moffitt, Jr. | 351/47 |
| 4,534,627 | 8/1985 | Vosper | 351/47 |
| 4,955,707 | 9/1990 | Gazeley | 351/47 |
| 5,129,102 | 7/1991 | Solo | 2/10 |
| 5,335,025 | 8/1994 | Wang | 351/44 X |

FOREIGN PATENT DOCUMENTS

| 612955 | 1/1961 | Canada . | |
|---|---|---|---|
| 773287 | 12/1967 | Canada | 2/13 |
| 1271934 | 7/1990 | Canada | G02C 9/04 |
| 1290964 | 10/1991 | Canada | G02C 9/02 |
| 1296932 | 3/1992 | Canada | G02C 9/04 |
| 266498 | 3/1927 | United Kingdom | 2/13 |

Primary Examiner—William L. Sikes
Assistant Examiner—David R. Parsons
Attorney, Agent, or Firm—Norman M. Cameron

[57] ABSTRACT

A visor includes thin, flat, opaque member. The rear of the member is concave to conform to a wearer's forehead. There is means for mounting the visor on the top of a pair of eyeglasses so the member extends forwardly in front of the eyeglasses and rearwardly to the wearer's forehead. The means may be a pair of spaced-apart clips extending from the bottom of the member intermediate the front and the rear thereof. Each clip has a bottom, an aperture above the bottom and a slit extending from the aperture to the bottom of the clip. The slit is narrower than the aperture. The top of the frame of a pair of eyeglasses is receivable in the aperture of each clip to secure the visor to the eyeglasses.

8 Claims, 1 Drawing Sheet

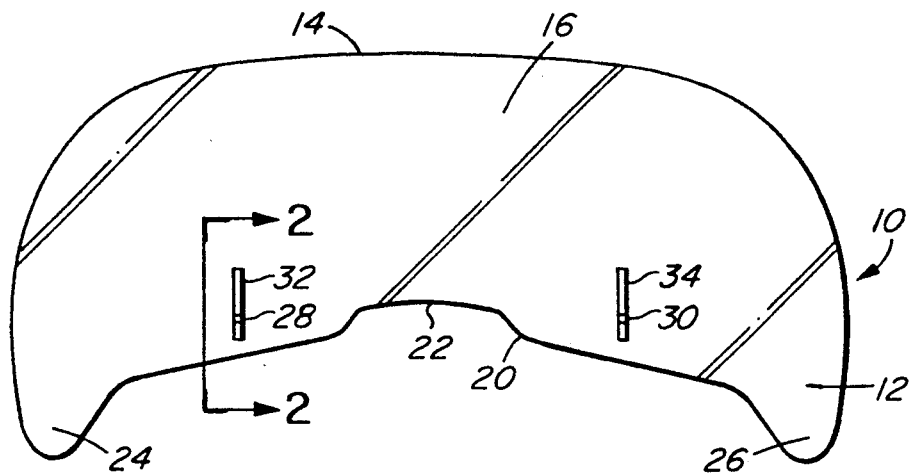
FIG. 1
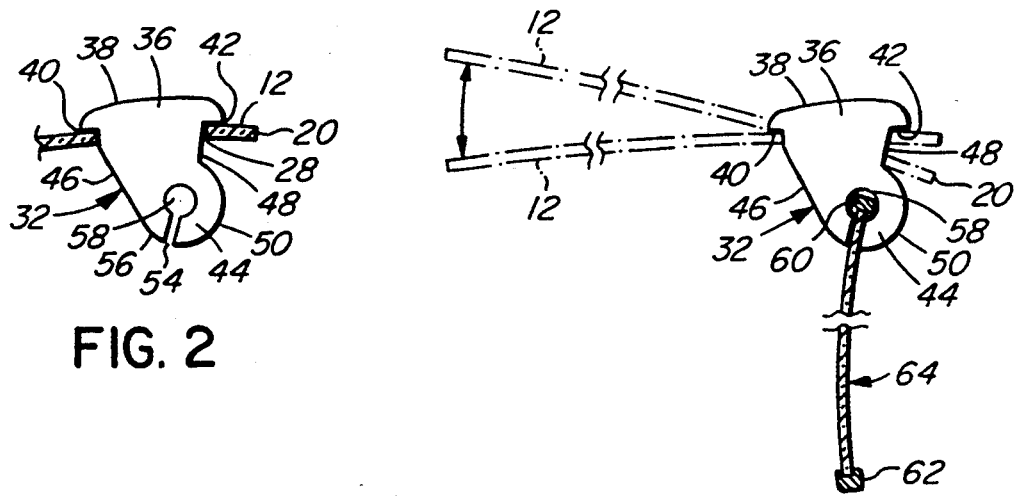
FIG. 2
FIG. 3
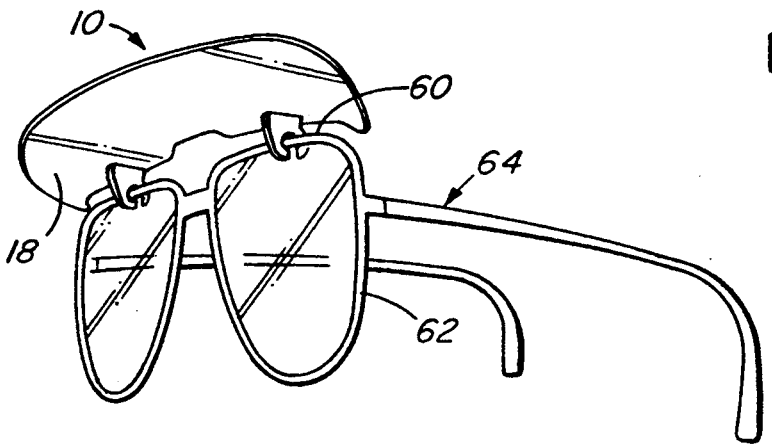
FIG. 4

VISOR FOR EYEGLASSES

BACKGROUND OF THE INVENTION

1. Field of the Invention

This invention relates to visors adapted to fit onto the frames of eyeglasses.

2. Description of Related Art

Eyeglass users have frequently encountered problems with glare and bright light from the sun and other sources. A common solution has been to provide so-called "clip-ons" which are tinted, auxiliary lenses which clip onto the frames of eyeglasses. Frequently these clip-ons can tilt up out of the way when not required. There are many patents relating to such devices including, for example, U.S. Pat. No. 3,876,295 to Loughner and U.S. Pat. No. 4,534,627 to Vosper. However, theses devices do not solve all problems associated with bright lights and glare. For example, bright lights can be directed into the space between the eyeglasses and the user's face and thus enter in the eyes without passing through the lenses. The same problem even occurs with regular sunglasses, whether the prescription type or the non-prescription type.

One solution might be for the user to wear a hat with a visor to shade the eyes. However, such caps appear informal and are not suitable for many occasions. Furthermore, they cannot readily be carried around for occasional use.

It has been suggested that flip up and down glasses could be combined with the visor of a cap as disclosed, for example, in U.S. Pat. No. 5,129,102 to Solo. However, this device suffers the disadvantages associated with the need to wear a cap.

Accordingly, it is an object of the invention to provide an improved visor to shade an eyeglass wearer's eyes from bright lights, but which does not require a cap to be worn.

It is another object of the invention to provide an improved visor which is simple in construction, economical to produce, rugged and easily portable.

It is a further object of the invention to provide an improved visor which can be readily clipped onto eyeglasses without special tools or fittings.

It is a still further object of the invention to provide an improved visor for glasses which can be tilted to different positions to suit the user's requirements.

SUMMARY OF THE INVENTION

In accordance with these objects, there is provided a visor having a thin, flat, opaque member. The member has a bottom, a front and a rear. The rear of the member is concave to conform to a wearer's forehead. There is means for mounting the visor on the top of a pair of eyeglasses so the member extends forwardly in front of the eyeglasses and rearwardly to the wearer's forehead.

A pair of spaced-apart clips may extend from the bottom of the member intermediate the front and the rear thereof. Each said clip has a bottom, an aperture above the bottom and a slit extending from the aperture to the bottom of the clip. The slit is narrower than the aperture.

In a preferred form of the invention, the member has a pair of slits extending between the front and the rear thereof, the clips being thin flat members extending through the slits in the member.

Each of the clips may have an enlarged top portion on top of the member, an enlarged lower portion on the bottom of the member, a front, a rear and a notch at the rear between the top portion and bottom portion. The rear of the member is received in the notch. The member is pivotal about the front of the clip between the enlarged top and bottom portions to each side of the notch.

The invention thereby overcomes many of the deficiencies associated with the prior art. The visor is portable and simple and rugged in construction so that it can be produced economically and carried about on the person when not required. It essentially eliminates light passing into a person's eyes through the space between eyeglasses and the forehead. It can be used with conventional eyeglasses and sunglasses. The visor can be easily installed in a few seconds and just as easily removed when not required. It is neat and relatively inconspicuous compared to a cap with a visor and therefore is more readily accepted by many potential wearers. It also useful for keeping rain off glasses and the face.

BRIEF DESCRIPTION OF THE DRAWINGS

In the drawing:

FIG. 1 is a top plan view of a visor according to an embodiment of the invention;

FIG. 2 is a sectional view taken along line 2—2 of FIG. 1;

FIG. 3 is a side elevation of one of the clips similar to FIG. 2, shown attached to a pair of eyeglasses and with the visor thereof shown in broken lines in two different angular positions; and FIG. 4 is a front, side isometric view of a combination of the visor of FIG. 1 and a pair of eyeglasses.

DESCRIPTION OF THE PREFERRED EMBODIMENTS

Referring to the drawings, these show a visor 10, principally comprising a single thin, flat member 12 of an opaque, relatively rigid material such as polyethylene. Such a plastic is somewhat flexible although relatively rigid and therefore will not easily break in use. The member 12 has a convex front 14, a top 16 and a bottom 18 shown in FIG. 4. The member also has a concave rear 20 best seen in FIG. 1. It may be seen that the rear is shaped to fit about the forehead of the user, having a recess 22 for the top of the nose and side portions 24 and 26 which extend rearwardly on each side of a wearer's face.

The member 12 has a pair of spaced-apart slits 28 and 30 which are near the rear 20 and are elongated in the direction extending towards the front 14. The slits are of a size and configuration to receive a pair of clips 32 and 34 which are best understood with reference to FIG. 2 which shows clip 32. Each clip has a top portion 36 on top of member 12 which has a rounded top 38 and a pair of shoulders 40 and 42 which fit against the top of the member 12 on either side of the slit 28.

The clip also has a somewhat oval-shaped bottom portion 44 which is also enlarged relative to the slit. The bottom portion has a front 46 which is angled forwardly and upwardly towards the shoulder 40. There is a notch 48 formed at back 50 of each clip below the top portion 36. The notch is thus between the enlarged top portion and bottom portion. The rear 20 of the member is received in the notch. As seen in FIG. 3, this allows the member 12 to tilt up and down to a desired position at a pivot point just below shoulder 40 while the rear 20 of the member moves between shoulder 42 the enlarged bottom portion 44.

There is a slit 54 communicating with bottom 56 of each clip. The slit extends upwardly to an enlarged aperture 58 near the center of the enlarged bottom portion. This permits the clips to be fitted over top 60 of frame 62 on a pair of eyeglasses 64 as seen in FIG. 3 and 4. The slit is narrower than the aperture 58 so that the visor is held firmly in place once the frame is pushed through the slit and received in the aperture 58. The type of clip can be different than described above, depending for example upon the type of glasses being fitted with the visor.

The visor can be made in different shapes and sizes to accommodate other popular styles of eyeglasses such as wrap-around style glasses. It can be made in various colors. The visor is also useful for repelling rain as well as sun protection. It can be adapted as a promotional item by printing advertisements on member 12.

It will be understood by someone skilled in the art that many of the details provided above are by way of example only and are not intended to limit the scope of the invention which is to be interpreted with reference to the following claims.

What is claimed:

1. In combination:
    a pair of eyeglasses having two lenses, each having a front and a rear and a frame extending above the lenses; and
    a visor including a visor member above the lenses having a front portion extending forwardly beyond the front of the lenses and a rear portion extending rearwardly beyond the rear of the lenses, the visor having clips fitted to the frame of the eyeglasses above the lenses and connected to the visor member, each of the clips having a bottom, a slit extending upwardly from the bottom and an enlarged opening above the slit, the frame of the eyeglasses extending through said opening, the clips being pivotally connected to the visor member, whereby the visor member can be tilted relative to the eyeglasses.

2. A combination as claimed in claim 1, wherein the rear portion of the visor is concave.

3. A combination as claimed in claim 1, wherein the visor member is thin and flat and the rear portion thereof is concave to conform to a person's forehead.

4. A visor for fitting on top of a pair of eyeglasses having a frame with a top, the visor comprising:
    a thin, flat member of an opaque rigid material, the member having a convex front, a concave rear shaped to fit a user's forehead and a pair of spaced-apart slits extending part way between the front and the rear; and
    a pair of clips for mounting the visor on the top of the frame, each said clip having a top portion on top of the member, a bottom portion on the bottom of the member, the member being received between the top and bottom portions, the top portion and the bottom portion being longer than the slits to retain the member therebetween, a rear and a notch at the rear thereof, the rear of the member being movable along the notch between the top portion and the bottom portion of the member to tilt the member relative to the clips, the bottom portion of each said clip having a bottom with a slit extending towards the top portion and an aperture communicating with the slit above the bottom, the aperture being wider than the slit in the clip to retain the frame of the eyeglasses.

5. A visor, comprising:
    a thin, flat visor member having a top, a bottom, a front and a rear, the rear of the member being concave to conform to a wearer's forehead, the visor member having a pair of slits extending from the front to the rear thereof; and
    a means for mounting the visor on the top of a pair of eyeglasses so the member extends forwardly in front of the eyeglasses and rearwardly to the wearer's forehead, the means including a pair of clips on the visor member, the clips being spaced-apart and extending from the bottom of the visor member intermediate the front and the rear thereof, each said clip being a thin, flat member extending through one of the slits of the visor member and having a bottom, an aperture above the bottom and a slit extending from the aperture to the bottom of the clip, the slit on each said clip being narrower than the aperture.

6. A visor as claimed in claim 5, wherein the visor member is pivotally connected to the clips.

7. A member as claimed in claim 5, wherein the clips have enlarged top portions on the top of the visor member.

8. A visor as claimed in claim 7, wherein each of the clips has an enlarged lower portion on the bottom of the visor member, a front, a rear and a notch at the rear between the top portion and the bottom portion, the rear of the visor member being received in the notch, the visor member being pivotable about the front of the clip between the enlarged top portion and bottom portion to each side of the notch.

* * * * *